US005802329A

United States Patent [19]

Combs et al.

[11] Patent Number: 5,802,329

[45] Date of Patent: Sep. 1, 1998

[54] DEVICENET ADDRESS VERIFICATION

[75] Inventors: Pamela S. Combs, Horse Shoe; Mark E. Innes, Asheville, both of N.C.

[73] Assignee: Eaton Corporation, Cleveland, Ohio

[21] Appl. No.: 510,720

[22] Filed: Aug. 3, 1995

[51] Int. Cl.[6] .................. G06F 13/40

[52] U.S. Cl. .................. 395/289; 340/653; 340/815.45

[58] Field of Search .................. 340/815.7, 653, 340/815.45; 395/289; 370/449, 451

[56] References Cited

U.S. PATENT DOCUMENTS

| | | | |
|---|---|---|---|
| 4,298,775 | 11/1981 | Buck et al. | 379/387 |
| 4,446,520 | 5/1984 | Shigera et al. | 364/470.08 |
| 4,541,633 | 9/1985 | Newbill | 273/238 |
| 4,558,188 | 12/1985 | Stupartis et al. | 379/6 |
| 4,624,661 | 11/1986 | Arimond | 604/151 |
| 4,845,492 | 7/1989 | Cobb et al. | 340/825.49 |
| 4,908,800 | 3/1990 | DiLemmo | 367/13 |
| 5,365,495 | 11/1994 | Cussen | 368/79 |
| 5,644,730 | 7/1997 | Fayfield | 395/289 X |
| 5,666,129 | 9/1997 | Wurster et al. | |

OTHER PUBLICATIONS

Peatman, John B. "Microcomputer–based Design" McGraw–Hill pp. 170–179, 228–233, 252–259, Dec. 1977.

*Primary Examiner*—Mark R. Powell
*Attorney, Agent, or Firm*—Charles E. Kosinski

[57] ABSTRACT

A unique combination of nonvolatile memory (16) with a visual indicator (18) to give a device an address display which adds very little cost or space to the device and its housing. A nonvolatile RAM incorporated into the device electronics is provided with a memory location sufficient for storing the identifier in binary form. A simple visual display in the form of an LED (18) is also provided in the device housing and electrically connected to the RAM for providing visual indication of the stored number according to a predefined code.

4 Claims, 1 Drawing Sheet

DEVICENET ADDRESS VERIFICATION

BACKGROUND AND SUMMARY OF THE INVENTION

The present invention relates generally to electronic display means for identifying devices interconnected by a communication network, and more particularly, to a unique system and method for visually displaying a device identification number while requiring a minimum of space.

Various communication network protocols, for example that of DeviceNet, an Allen-Bradley originated "open" network protocol for use in interconnecting a plurality of factory floor devices, require that each device connected to the network maintain a unique address or identifier. In DeviceNet, a unique MAC ID identifier which must be a number between zero and 63 is required. This identifier is specified as being maintained in nonvolatile random access memory (RAM) or in the form of hardware, settable through manually actuable rotary or dip switches.

As complexity in these types of systems has increased, the cost and size of the interconnected devices have been driven down. These size and cost constraints have required the virtual elimination of large and relatively expensive components such as switches and electronic displays from the devices. However, system complexity has made it imperative that the identifier be made visible from the exterior of the devices for purposes such as device programming.

To solve this dilemma, the present invention provides a unique combination of nonvolatile memory with a visual indicator to give a device an address display which adds very little cost or space to the device and its housing. A nonvolatile RAM incorporated into the device electronics is provided with a memory location sufficient for storing the identifier in binary form. A simple visual display is also provided in the device housing and electrically connected to the RAM for providing visual indication of the stored number according to a predefined code.

Those and other features and advantages of the present invention will become apparent upon review of the following description taken in conjunction with the accompanying drawings.

DETAILED DESCRIPTION OF THE PREFERRED EMBODIMENT

Figure 1:
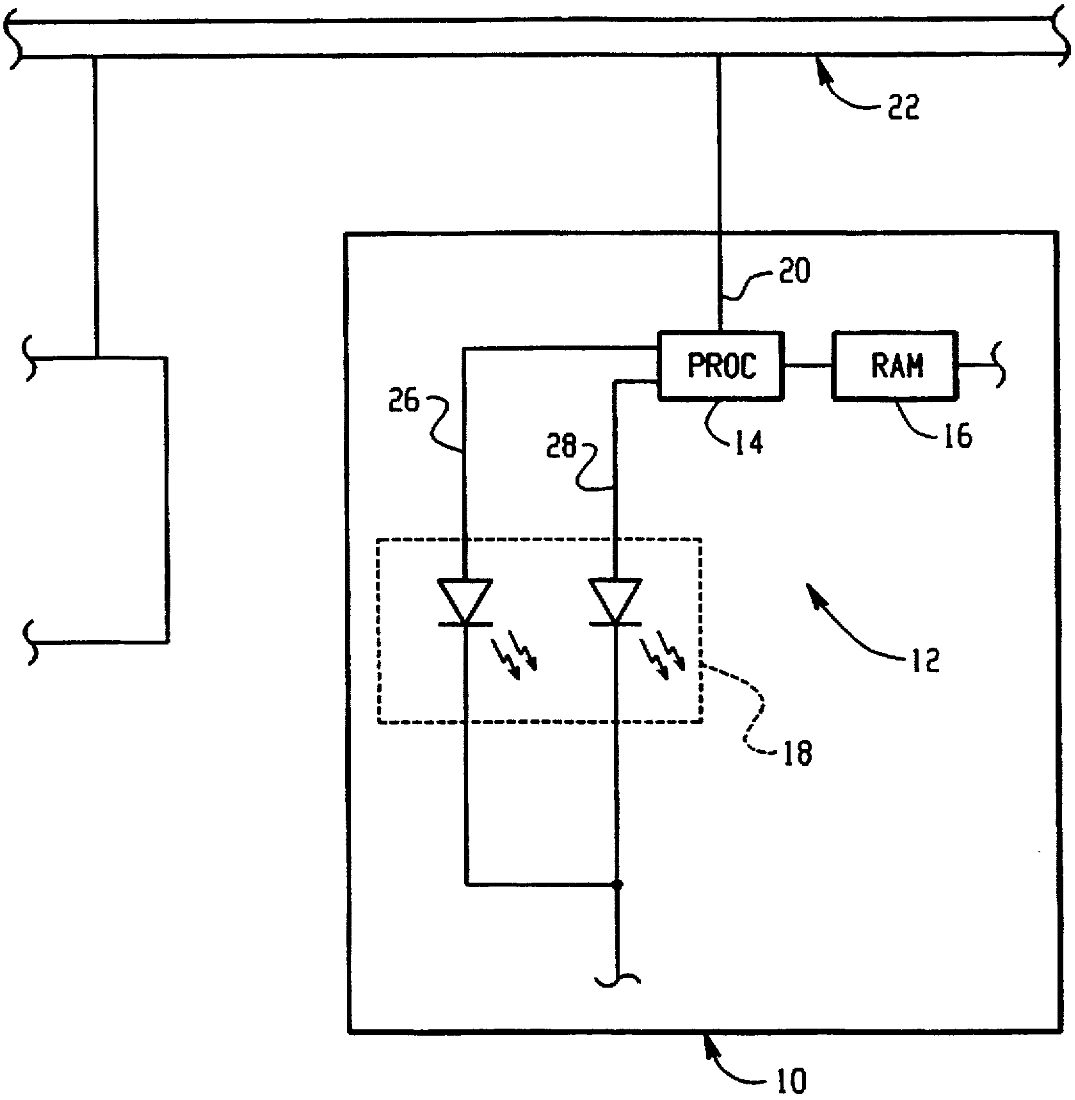
FIG. 1 is a schematic view of a device having an identifier display provided in accordance with the teaching of the present invention.

Turning now to the figure, a device to be interconnected on a communication network is indicated generally at 10. While device 10 is disclosed herein as being a motor starter which is part of a manufacturing system having a plurality of devices interconnected by a network utilizing the DeviceNet protocol, it should become readily apparent that the present invention is equally well suited for use in conjunction with various types of devices in a variety of applications, to be connected by a network of any protocol.

Device 10 preferably includes an outer housing which encloses the present display system 12 having a microprocessor 14. Electrically connected thereto are a random access memory device 16 and a visual indicator, preferably a bicolor light emitting diode (LED) 18. Microprocessor 14 and RAM 16 may be provided as separate components in addition to the electronics of device 10, or alternately, their functions may be performed utilizing available capacity of electronic components integral to device 10, thereby necessitating only the provision and electrical connection of LED 18. Microprocessor 14 is preferably electrically connected via an electrical line 20 to a network bus structure 22. Network bus 22 is preferably adapted to transmit data, commands and other such relevant information between device 10 and other such devices interconnected thereby. Network 22 facilitates this information transfer in order to provide each device with information necessary to carry out a coordinated process.

In order to accomplish this, it is often required that each individual device interconnected by network bus structure 22 be identifiable by some unique address, name or other identification. DeviceNet, for example, requires that each device have a unique MAC ID identifier in the form of a number between zero and 63. This number generally must be accessible over bus structure 22. In addition, it is also preferably indicated externally to device 10 so as to enable a system programmer or maintenance engineer to be able to accurately locate device 10 for address verification during repair, programming or re-programming. Since changes are often made to systems of this type, it is generally insufficient to place devices on the network bus structure 22 in a predefined order without external means of device identification. Since down time of a system is typically very expensive, it is essential to be able to accurately locate and verify each device on the network in the least amount of time.

While the provision of some type of mechanical switch or a liquid crystal display provide an easy solution to this problem, they usually contribute to unnecessary device cost and require that the device be large enough to accommodate the display. The fact that there is always an effort to reduce the cost of each device, in spite of a conflicting need to provide intelligence at the device level, limits the range of available solutions.

The present invention utilizes a light emitting diode (LED) 18 as a visual indicator in order to provide a simple, small and inexpensive means for creating a numeric display. LED 18 is preferably mounted to an outer housing of device housing 10, in a position which facilitates the best visual access and is preferably bicolor, able to be illuminated in either of two colors, typically red and green. An appropriate signal provided from microprocessor 14 onto either lead 26 or lead 28 electronically provides an illumination instruction to LED 18.

While LED 18 can be illuminated in any number of methods to produce a numeric indication, one preferred method is to enunciate the ten's place digit by flashing red the number in the ten's place, followed by flashing green the number in the one's place. Preferably, appropriate pauses are provided between each flash so as to make the numbers easily discernable. The flash is also preferably at a rate perceivable by the human eye, in this exemplary embodiment consisting of a duration of about 0.3 seconds per flash with a one second pause between sets of flashes.

For example, a MAC ID 24 display would consist of one second of off time, followed by two red flashes, at a rate of 0.3 seconds per flash, and then four green flashes at the same rate. While one of skill in the art will find it readily apparent that any other suitable time periods may alternately be employed, this method provides a worst case address display indicating MAC ID 59 in less than ten seconds. In a similar fashion, additional color capabilities of LED 18 would enable additional digits, or alternately flashing red and green with larger pauses between numbers could be used to accomplish the same function. The flashing display of the device identifier can be initiated upon request through the network and bus structure 22 or may be initiated on a periodic basis with a preprogrammed interrupt function.

The foregoing discloses and describes merely an exemplary embodiment of the present invention. One skilled in the art will readily recognize that various changes and modifications can be made thereto without departing from the spirit and scope of the invention as set forth in the following claims.

What is claimed is:

1. In an electronic display for visually indicating a unique identification number for a device interconnected by an electronic communication network to at least one other such device, said unique identification number corresponding to an address for said device on said communication network, said device including means for communicating electronically over said network, a method of providing a visual indication of said unique number comprising the following steps:

providing a bi-color light emitting diode (LED) externally on said device;

electrically coupling a nonvolatile random access memory (RAM) to said LED;

storing said unique identification number in said RAM; and electrically coupling a microprocessor to said LED and to said RAM, said microprocessor being programmed to illuminate said LED, said microprocessor:

illuminating a first color of said LED a number of flashes equal to the digit in the tens place of said unique identification number;

turning off said LED for a predetermined time period; and illuminating a second color of said LED a number of flashes equal to the digit in the ones place of said unique identification number.

2. The method of claim 1 wherein said flashes are at a rate of approximately 0.3 seconds per flash.

3. The method of claim 2 wherein said predetermined time period is approximately one second.

4. The method of claim 1 further comprising the step of illuminating said second color of said LED a number of flashes equal to the digit in the hundreds place of said number.

* * * * *